United States Patent
Kastner et al.

(10) Patent No.: US 6,445,141 B1
(45) Date of Patent: Sep. 3, 2002

(54) POWER SUPPLY FOR GAS DISCHARGE LAMP

(75) Inventors: Mark Kastner; Harry M. Pyne, both of New Berlin, WI (US)

(73) Assignee: Everbrite, Inc., Greenfield, WI (US)

( * ) Notice: Subject to any disclaimer, the term of this patent is extended or adjusted under 35 U.S.C. 154(b) by 0 days.

(21) Appl. No.: 09/719,322

(22) PCT Filed: Jun. 30, 1999

(86) PCT No.: PCT/US99/14860

§ 371 (c)(1),
(2), (4) Date: Feb. 5, 2001

(87) PCT Pub. No.: WO00/02423

PCT Pub. Date: Jan. 13, 2000

Related U.S. Application Data

(60) Provisional application No. 60/091,449, filed on Jul. 1, 1998.

(51) Int. Cl.[7] .................................................. G05F 1/00
(52) U.S. Cl. ........................ 315/307; 315/219; 315/309; 315/360
(58) Field of Search ................................ 315/307, 219, 315/224, 225, 276, 279, 282, 283, 291, 302, 309, 308, 360

(56) References Cited

U.S. PATENT DOCUMENTS

| | | | | |
|---|---|---|---|---|
| 4,471,268 A | * | 9/1984 | Brown et al. | 315/178 |
| 6,011,360 A | * | 1/2000 | Gradzki et al. | 315/209 R |
| 6,124,682 A | * | 9/2000 | Lakin et al. | 315/209 R |

* cited by examiner

*Primary Examiner*—Don Wong
*Assistant Examiner*—Thuy Vinh Tran
(74) *Attorney, Agent, or Firm*—Michael Best & Friedrich LLP

(57) ABSTRACT

A power supply for a gas discharge lamp is claimed. An input circuit receives power from a power source. An output transformer having a primary winding and a secondary winding and has a lamp connected in circuit across the secondary winding. First and second power switches switch power to the primary winding. The driver drives the power switches at a drive frequency. A tuned LC resonant circuit having a resonant frequency is connected in circuit between the driver and the lamp. A controller generates control signals to the driver at a first frequency that is functionally related to the drive frequency, and regulates the lamp current by controlling the difference between the resonant frequency and the first frequency.

75 Claims, 10 Drawing Sheets

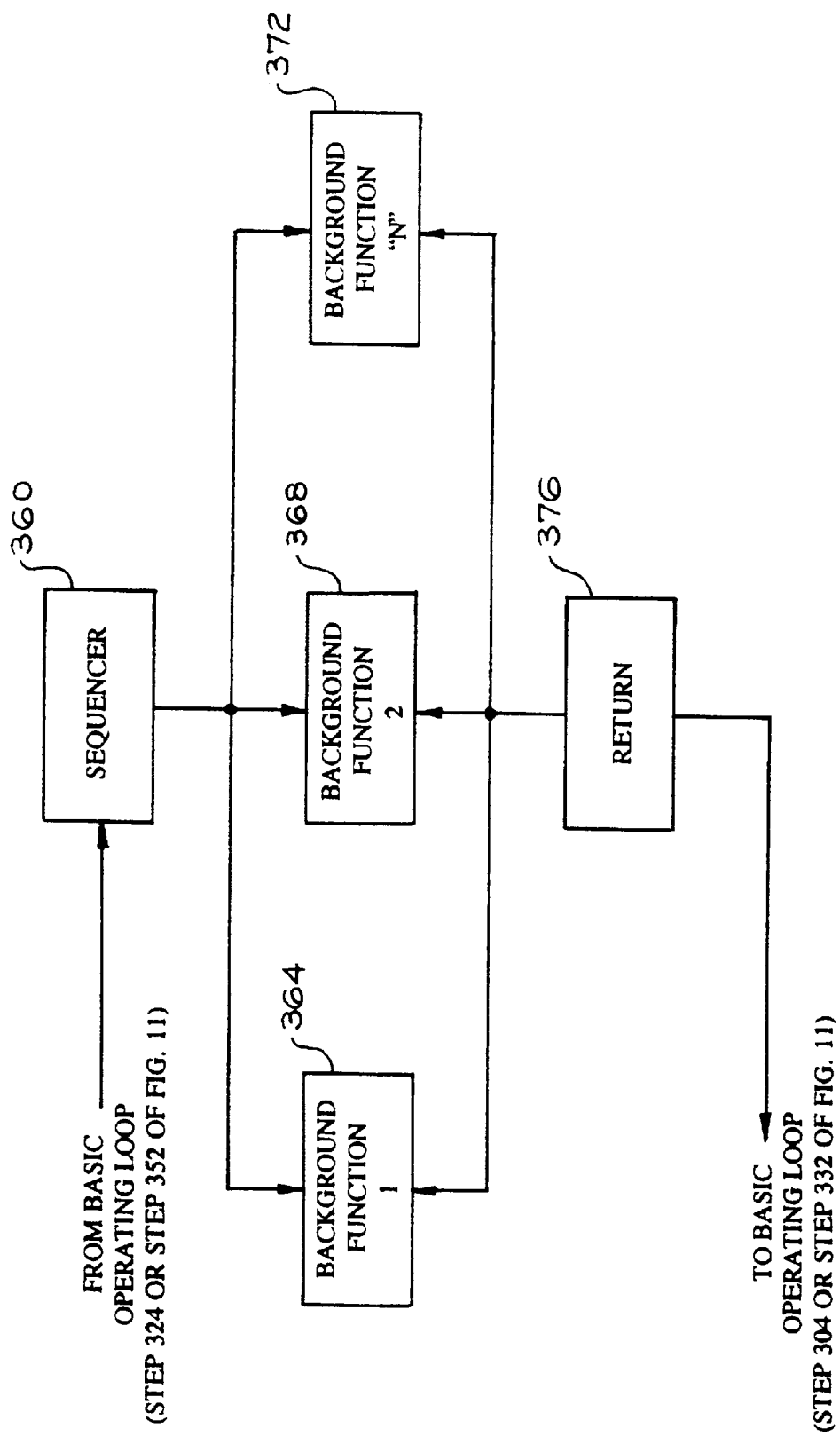

POWER SUPPLY FOR GAS DISCHARGE LAMP

This application claims the benefit of Provisional Patent Application No. 60/091,449, filed on Jul. 1, 1998, which is incorporated by reference herein.

BACKGROUND OF THE INVENTION

Many types of power supplies are known for powering gas discharge lamps. It is often desirable to regulate the output of the lamp to change its brightness level, or to cause it to flicker, flash or the like. In addition, the lamps characteristics change over time as the lamp ages, potentially causing the lamp to have reduced brightness. In these and other instances, it is desirable to regulate the lamp current to keep the brightness at a uniform level.

SUMMARY OF THE INVENTION

A power supply for a gas discharge lamp is disclosed that uses a unique method of regulating the lamp current. In a preferred embodiment, the power supply includes an input circuit that receives power from a power source, an output transformer having a primary winding and a secondary winding, with the lamp being connected in circuit across the secondary winding, first and second power switches that switch power to the primary winding, and a driver that drives the switches at a drive frequency. The power supply also includes a tuned LC resonant circuit having a resonant frequency, that is connected in circuit between the driver and the lamp, and a controller that generates control signals to the driver at a first frequency that is functionally related to the drive frequency. The first frequency may equal the drive frequency. The controller regulates the lamp current by controlling the difference between the resonant frequency of the LC resonant circuit and the first frequency.

The power supply operates at maximum efficiency or maximum brightness when the drive frequency is approximately equal to the resonant frequency. However, the brightness of the lamp can be reduced, dimmed and regulated by adjusting the difference between resonant frequency and the drive frequency. If the first frequency or the drive frequency is less than the resonant frequency, a decrease in the first frequency or the drive frequency will detune the tuned LC resonant circuit and the lamp current will be reduced. Likewise, if the initial drive frequency is greater than the resonant frequency, the drive frequency can be increased to also reduce the efficiency of the lamp and thus dim the lamp.

In a preferred embodiment, the transformer is a step-up transformer and the primary winding is a part of the LC resonant circuit.

The power supply preferably includes a microprocessor controller having a flash memory and an electrically erasable programmable read-only memory (EEPROM). The EEPROM may be used to store a variety of data, including run time information, fault information, and information regarding the number of ON and OFF cycles of the lamp.

Preferably, any number of operations may be performed while the software is running one or more background routines. For example, any of the following may be performed during the running of the background routine: checking for fault conditions, changing the first or drive frequencies, determining the brightness level of the lamp, resetting a watch dog timer, recording data in non-volatile memory or executing a lamp shutdown.

It is a feature and advantage of the invention to provide a power supply that operates at maximum efficiency or maximum brightness when the drive frequency is approximately equal to the resonant frequency.

It is another feature and advantage of the invention to regulate the brightness of a lamp by adjusting the difference between the resonant frequency and the drive frequency.

It is another feature and advantage of the invention to use run time information for both fault analysis and for changing operating characteristics of the power supply.

It is another feature and advantage of the invention to provide a heat detection system in the power supply to render the power supply inoperable upon the detection of over-temperature conditions.

It is another feature and advantage of the invention to provide a low-power operation mode for the power supply to minimize power consumption.

It is another feature and advantage of the invention to eliminate the need to periodically restrike the load.

It is another feature and advantage of the invention to use an electrically erasable programmable read only memory device (EEPROM) in conjunction with the power supply, and to store serial numbers and date codes in the EEPROM.

These are the features of the present invention will be apparent to those skilled in the art from the following detailed description and the drawings, in which:

BRIEF DESCRIPTION OF THE DRAWINGS

FIG. 13 is a flow chart illustrating the timing sequence to operate background functions of a power supply of a gas discharge lamp.

Figure 1A:
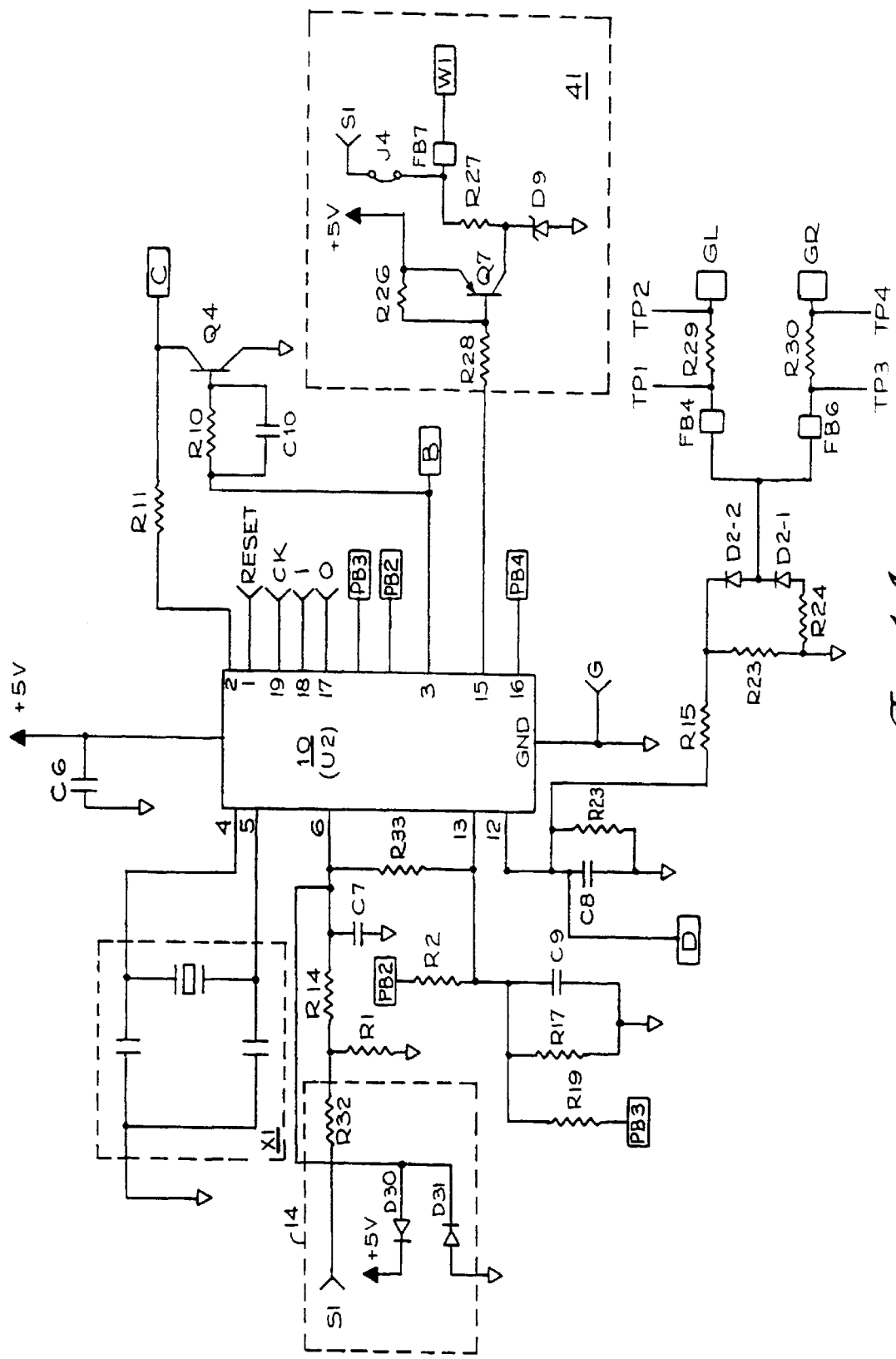
FIG. 1A is a schematic of a first portion of a power supply for a gas discharge lamp.

Before one embodiment of the invention is explained in detail, it is to be understood that the invention is not limited in its application to the details of the construction and arrangement of the components set forth in the following description or illustrated in the drawings. The invention is capable of other embodiments and are carried out in various ways. Also, it is understood that the phraseology and terminology used herein is for purpose of description and should not be regarded as limiting.

DETAILED DESCRIPTION OF THE PREFERRED EMBODIMENT

Figure 1B:
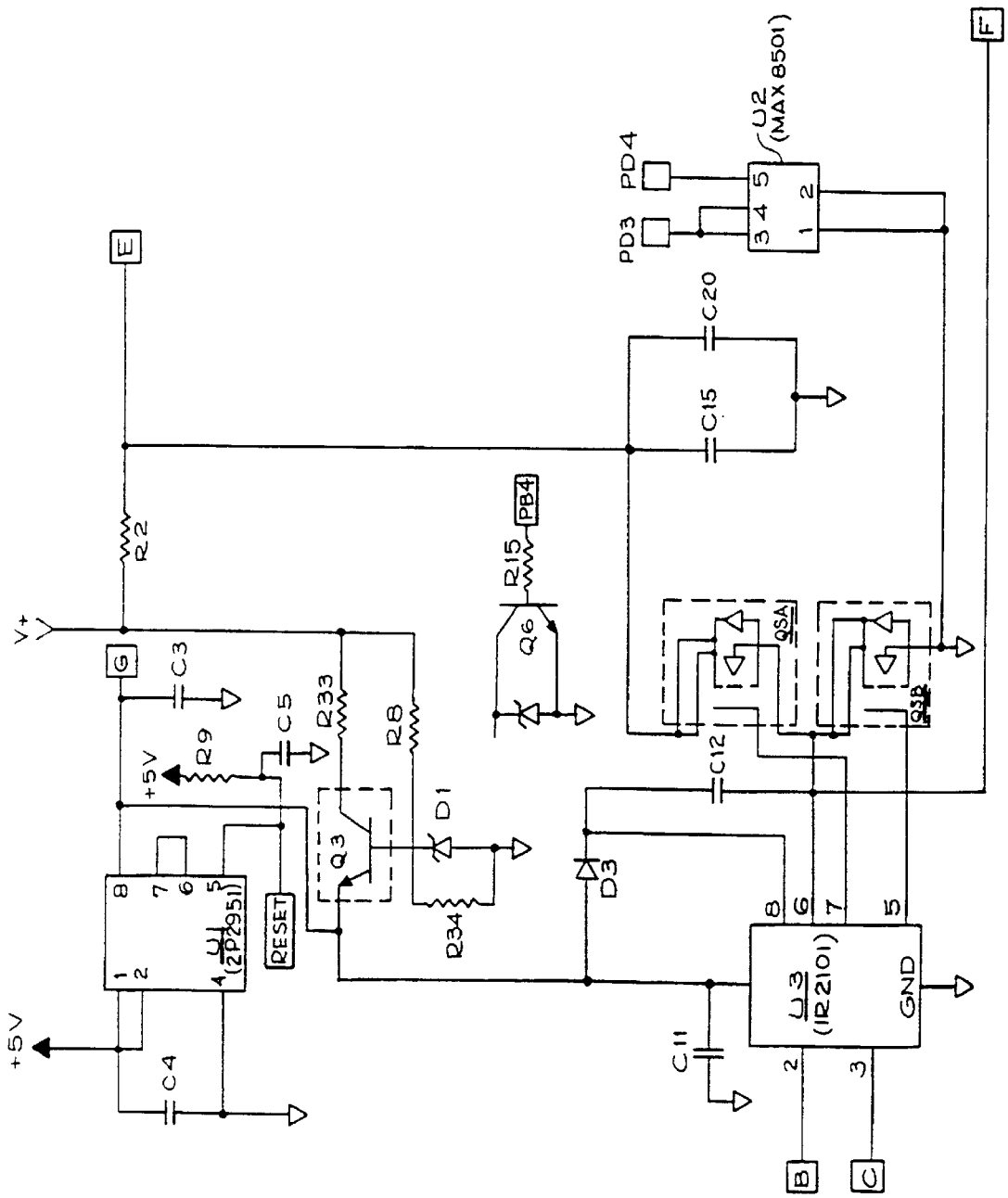
FIG. 1B is a schematic of a second portion of a power supply for a gas discharge lamp.
Figure 1C:
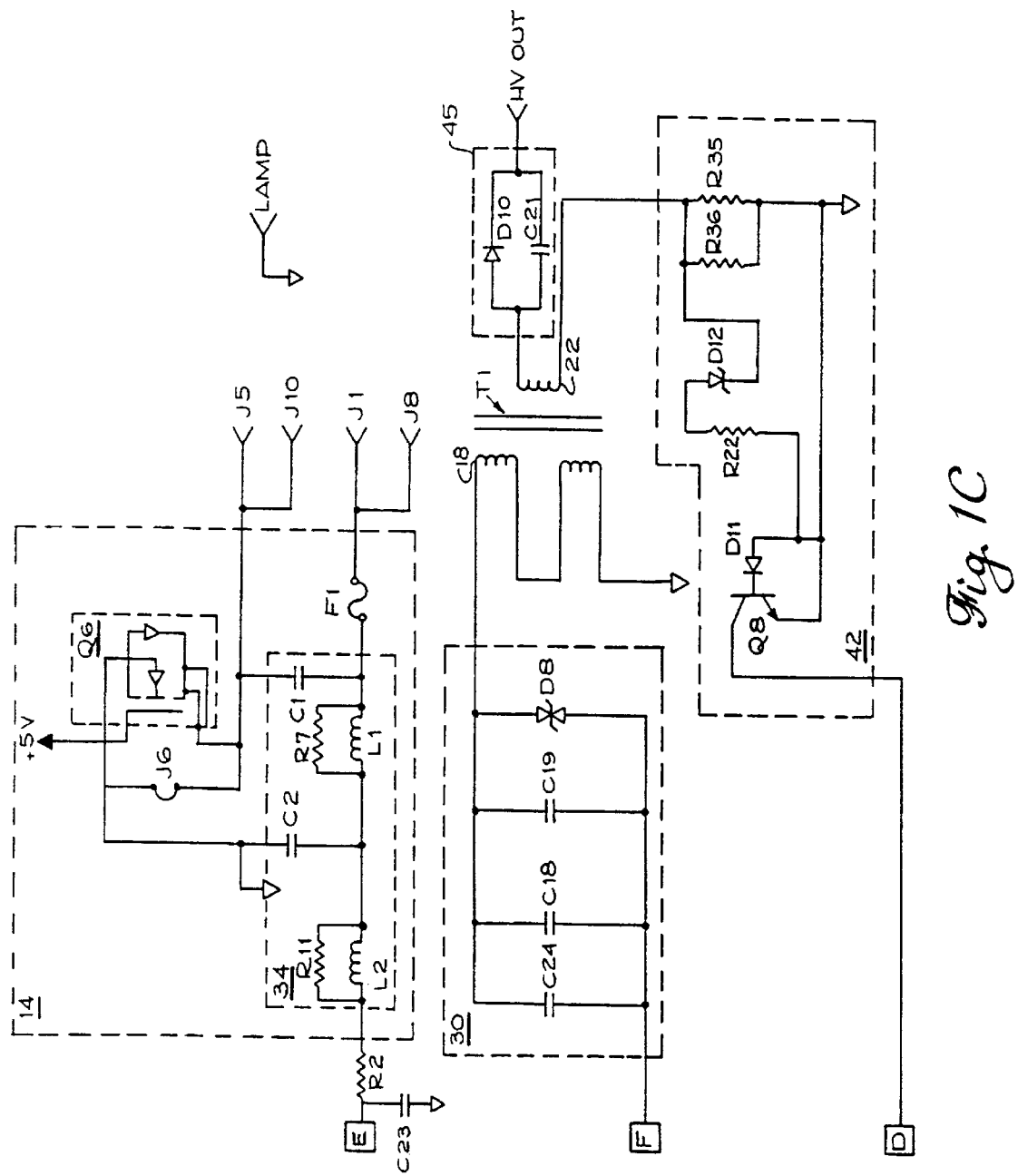
FIG. 1C is a schematic of a third portion of a power supply for a gas discharge lamp.

FIGS. 1A, 1B and 1C combined are a schematic diagram of a power supply for a gas discharge lamp. The power supply is controlled by a controller 10, such as a microprocessor or any integrated circuit that contains logic elements for manipulating data and for making decisions. An input circuit 14 receives power from a power source. In a preferred embodiment, the power source is a low voltage DC power source, although other configurations are possible using a high voltage DC or AC power source. Such configurations are discussed below. First and second power switches, MOSFETs Q5A and Q5B, are in a half-bridge arrangement and alternately switch power to a primary winding 18 of a transformer T1. The transformer T1 comprises the primary winding 18 and a secondary winding 22. A load, such as a lamp, is connected in circuit across the secondary winding 22. A driver U3 drives the switches QSA and Q5B at a drive frequency. A tuned LC circuit 30 is connected in circuit between the driver U3 and the load. The tuned LC circuit 30 operates at a resonant frequency. The controller 10 generates control signals and transmits the control signals to the driver U3. The control signals are sent at a first frequency that is functionally related to the drive frequency. The controller 10 regulates the current being input to the load by controlling the difference between the first frequency and the resonant frequency.

In operation, power enters the circuit at nodes J1 and J5. The power source for the control circuit is a low voltage DC power supply. Typically, the low voltage DC source is in a range of 12 to 36 volts. When properly connected, the power source is connected such that J1 is the positive terminal and J5 is the negative terminal. Terminals J8 and J10 provide a convenient connection point for providing power to additional power supplies.

As illustrated in FIG. 1C, incoming power passes through a fuse F1. Fuse F1 prevents the possibility of a fire hazard in the event of a major failure of the power supply. After passing through Fuse F1, power passes through an electromagnetic interference (EMI) filter 34 comprising a capacitor C1, an inductor L1, a capacitor C2 and an inductor L2. The EMI filter 34 reduces the level of conducted EMI entering the power source. As defined herein, EMI refers to electromagnetic radiation, such as continuous wave or transient electrical noise generated in the power supply circuit. High levels of EMI can adversely affect the operation of other equipment powered from the same source. In an alternate embodiment, inductors L1 and L2 can be replaced with jumpers R7 and R11. Operation in this mode may be desirable in applications where an EMI filter is not required.

A MOSFET Q6 provides reverse polarity protection. When power is properly connected at terminals J1 and J5, positive DC current flows into the positive input terminal through the circuit and into circuit ground, which is connected to the source (S) terminal of the N-channel MOSFET Q6. The negative input terminal of the power supply (J5) is at a ground potential, and is connected to the drain (D) terminal of Q6. When the MOSFET Q6 is biased, the source (S) terminal is more positive than the drain (D) terminal, allowing the body diode of the MOSFET Q6 to conduct, rendering the source (S) terminal at a voltage level approximately equal to one diode drop level greater than the voltage level of ground. The gate (G) terminal is connected to the circuit's 5 volt power supply within the circuit, thereby establishing a positive gate (G) to source (S) bias, and thus turning the MOSFET Q6 ON. Once the MOSFET Q6 is ON, its low channel resistance causes the voltage drop across the MOSFET Q6 to be very low. In low voltage applications, the resistance is typically in the range of 0.01 ohm to 0.1 ohm.

In the event that power is connected with reverse polarity (i.e., the positive terminal being J5 and the negative terminal being J1), the drain (D) node of MOSFET Q6 is at a positive potential with respect to the remainder of the circuit. The source (S) and the gate (G) of MOSFET Q6 are both at a ground potential, thus preventing the MOSFET Q6 from being forward biased. Thus, the MOSFET Q6 will not conduct and essentially act as a switch in the OFF position, thereby preventing reverse current flow through the circuit and subsequent circuit damage. Typically, MOSFET Q6 is an N-channel MOSFET. Lower resistances may be obtained using an N-channel MOSFET as opposed to a PWO channel MOSFET. Further, N-channel devices are normally used in half bridge configurations to minimize resistance and resulting conduction losses.

The capacitor C1 of the EMI filter 30 is connected to incoming ground, rather than the controlled circuit ground. Since capacitor C1 has the ability to absorb some amount of energy, capacitor C1 helps prevent damage to MOSFET Q6 in the event of an incoming transient current.

As illustrated in FIG. 1B, the half bridge that drives the lamp is composed of two N-channel MOSFETs, Q5A and Q5B. The MOSFETs Q5A and Q5B are ideally suited for use as switching elements in a half-bridge configuration of a low input voltage, low to moderate input current power supply line. The use of N-channel MOSFETs is desirable due to its low resistance and capability of high switching speeds. This combination of efficiency gain results in very low power dissipation and allows for the use of MOSFETs in small packages. In a preferred embodiment, the MOSFETs QSA and Q5B used are Model No. IRF7103, made by International Rectifier of El Segundo, Calif. Although MOSFETs are best suited for this application, it is contemplated that other types of switching devices may be used. For example, insulated gate bipolar transistor devices (IGBT) may be appropriate for high voltage and high power level applications.

The MOSFETs Q5A and Q5B are configured such that when one is ON, the other is OFF, and vice versa. If MOSFETs Q5A and Q5B are ON simultaneously, a very low resistance path will exist from the positive incoming power to the circuit ground. This will cause very high current to flow and blow fuse F1, rendering the circuit nonfunctional. In addition, MOSFETs Q5A and Q5B could be damaged. The programmed control within the controller 10 never attempts to drive both MOSFETs Q5A and Q5B simultaneously. However, should the controller 10 become locked up due to a power line transient, improper reset, an EMI event, or any other malfunction, both MOSFETs Q5A and Q5B are prevented from turning ON simultaneously by a cross conduct inhibit circuit. The cross conduct inhibit circuit is comprised by resistors R10, R11, capacitor C10 and transistor Q4. If the controller 10 attempts to turn ON both MOSFETs Q5A and Q5B at the same time, the cross conduct inhibit circuit will override one of the logic signals, thereby preventing the MOSFETs Q5A and Q5B from being ON simultaneously.

Transistor Q3, resistors R8, R33 and R34 and zener diode D1 condition a regulated input for the MOSFET driver U3. When used, this preregulator preregulates the input voltage to regulator U1. The preregulator insures that the input voltage into regulator U1 does not exceed the maximum allowable voltage. In a preferred embodiment, U1 is an LP 2915 microchip made by National Semiconductor of Santa Clara, Calif. having a maximum allowable incoming voltage of approximately 30 volts. The preregulator circuit prevents an incoming voltage from exceeding this amount.

Figure 14:
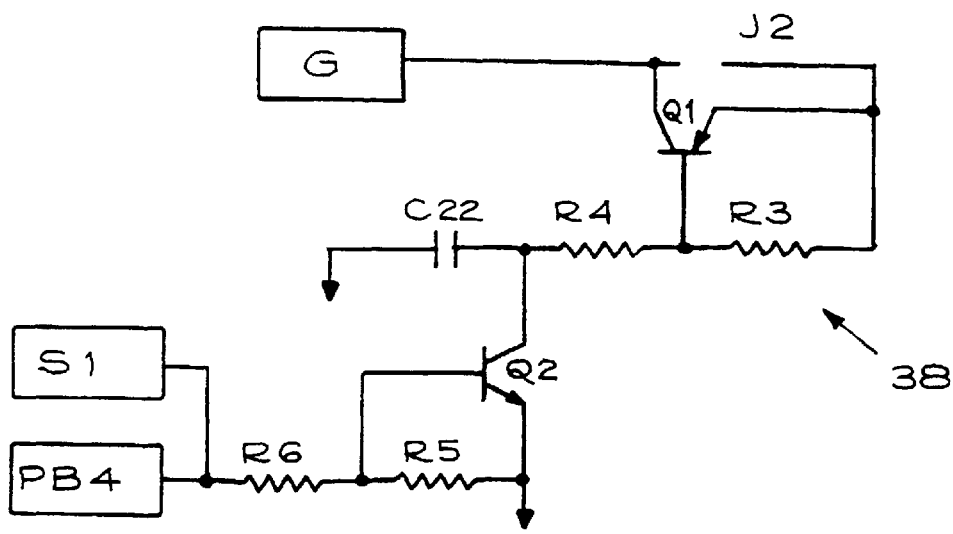
FIG. 14 illustrates an optional power down circuit for a power supply of a gas discharge lamp.

In the event that the source of power for the power supply is a battery, or the power supply is not operated for extended periods of time, it may be desirable to reduce the power consumption of the circuit. A power down option circuit 38 reduces power consumption under these conditions (FIG. 14). During normal operation, when transistor Q1 is ON, current is allowed to flow to the preregulator and other components. When transistor Q1 is OFF, current does not flow to other components within the circuit, thereby disabling the circuit. In the case of a shut down, when Q1 is OFF, the only current that flows is leakage current through Q1 and through MOSFETs Q5A and Q5B. The leakage current is typically far less than one micro amp, making the circuit ideal for use in battery powered applications. Transistor Q1 is normally in the OFF position as resistor R3 shunts the base to emitter junction of transistor Q1. Q1 is turned ON by transistor Q2, which sinks current from transistor Q1's base through resistor R4. Resistor R4 is a current limiting resistor for transistor Q1's base current. Capacitor C22, along with resistor R4, form an RC delay. The RC delay insures that if transistor Q2 momentarily turns ON, Q1 will stay ON long enough to power the five volt regulator and the controller, such that normal operations may continue. Resistor R5 shunts the base to emitter junction of transistor Q2, to insure that transistor Q2 does not turn ON in the absence of a true ON signal (as opposed to due to heat, noise and the like).

In operation, the control line input is used for two purposes: to turn the power supply ON and OFF, and to dim the power supply. Dimming is accomplished with pulse width modulation. The power supply's output is turned ON and OFF at a fixed frequency, typically in the range of about 60 to 200 Hz, and having a variable duty cycle corresponding to the brightness level. Maintaining a relatively high frequency helps prevent any flashing that may be perceived by the human eye. This function is accomplished by the control line signal's connection to the interrupt input of controller 10. The control line input is also connected to resistor R7, which forces transistors Q2 and Q1 ON when the control line is high. Many dimming techniques may be used, such as those described in Applicant's pending PCT International Patent Application Number PCT/US/19520 dated Jun. 2, 1999, which is incorporated by reference herein.

When the control line signal is being pulsed, the controller 10 overrides the control line input to the power down circuit 38 through a resistor R6 to prevent pulsing of the input power to the controller 10 and other components. The control line's ability to quickly and independently repower the circuit constitutes a unique feature that is particularly useful for battery powered applications.

Regulator U1 is a five volt regulator, which provides a stable source of five volt power to the controller 10. Capacitor C4 is an output capacitor used to stabilize regulator U1. Regulator U1 also provides a reset signal that is asserted low when its output voltage falls below out of tolerance, typically occurring when the voltage on the capacitor C20 is not sufficient to drive the circuit due to the source of input power being removed. The regulator signal is connected to the reset pin of the controller 10, and is useful when a drop in supply voltage, called a brown out, causes the controller 10 to enter an unknown state and lock up. The regulator U1 also helps insure that reliable power up resets when the input supply voltage may be rising slowly.

The reset output from regulator U1 is an open collector output. Regulator U1 allows a signal from the programming connector to force the controller 10 into the reset condition. A pull-up resistor R9 helps facilitate the low to high transition, and resistor R9 and capacitor C5 form a low pass filter to afford greater noise immunity.

The capacitor C3 provides decoupling of incoming power to regulator U1. Resistor R2 and capacitor C23 together comprise a low pass filter, which provides limited protection for regulator U1 and transistor Q1 against a high speed over voltage spike that may be present on the capacitor C20. The protection may be increased by increasing the value of either capacitor C23 or resistor R2.

Optimally, it is desirable to drive the load (lamp) at a constant current level under all conditions. Maintaining a constant current level provides the maximum luminance output without compromising life of the lamp. Without output current regulation, the transformer output current to the lamp may vary because of age of the lamp tube, the tube temperature, and the recent run history of the lamp. The supply voltage level also may affect the lamp current. Also, the length of the lamp tube may affect the lamp impedance, and therefore the current.

Thus, the invention provides a lamp power supply circuit to regulate the current at a constant level. The transformer's output current may be higher than the actual lamp current. Due to high voltage and high frequency characteristics of the transformer's output, stray capacitance realized by the output of the transformer and winding to winding capacitance within the transformer represent parallel current paths. Thus, despite the transformer output being connected in series with the lamp, the currents realized by the transformer output and by the lamp are not the same.

Current is regulated based on the current returning from the load to the circuit. The load connects to the circuit board at the GL or GR terminal. The GL terminal is identical to the GR terminal, but located at opposite ends of the circuit board for convenience. The lamp current passes through either resistor R29 or resistor R30, through a series of ferrite beads FB4 or FB6 to limit circuit noise, and rectified by diodes D2-1 and D2-2. The positive half-cycles of the current are passed through resistor R23 and subsequently used for current regulation. The negative half-cycles are passed through resistor R24, which provides a similar impedance for the negative half-cycles. The voltage developed across resistor R23 is divided and filtered by resistors R15 and R25, along with capacitor C8. This voltage is compared with the reference voltage in the controller's 10 comparator, and used to regulate the output frequency and therefore the output current. The time constant of the filter components R15, R25 and C8 are chosen to be long enough to filter out cycle to cycle variations in current, but short enough to be faster than the controller's regulation loop. Test points TP1, TP2 and TP3, TP4 allow for simplified measurement of the current at points GL and GR.

Balancing the impedance seen by the positive half-cycles and the negative half-cycles is important in case the lamp drive output becomes short circuited. In a short circuit case, the measuring circuit represents the majority of the impedance seen by the output transformer. An unbalanced measuring circuit may result in considerably more negative current than regulated positive current.

In an alternate embodiment, the power supply operates under a current regulatory scheme that increases current with a decrease in drive frequency. In such reverse operation power supplies, once the unit has reached its maximum output frequency, it is unable to bring the current into the regulation band, causing the controller 10 to command the power supply to shutdown on fault. In an alternate embodiment, it is desirable to limit the transformer output current to a maximum value for the purposes of safety and meeting test standards. Accordingly, an oversense option circuit 42 comprising resistors R35, R36 and R22, rectifier D11, diode D12, and transistor Q8 measures the transformer's secondary current.

In operation, the ground side transformer's secondary current passes through a resistor R35, developing a voltage proportional to the transformer's secondary current. The negative half-cycles of the voltage forward biases zener diode D12 and rectifier D11, and are shunted to ground. The positive half-cycle reverse biases zener diode D12 and turns ON transistor Q8 if the voltage is sufficiently large. Thus, the voltage normally developed across capacitor C8 is cut off, causing the controller 10 to not realize that any lamp current exists, and accordingly shuts off the power supplies output.

During normal operation, resistor R22 maintains transistor Q8 in an OFF position to prevent it from interfering with current regulations. In a preferred embodiment, the threshold for the transformer current sensor is set 20 to 50 percent higher than the desired load current, ensuring that small amounts of stray capacitance do not prevent the circuit from normal operation.

S1 is the control input to the power supply. The control input is loaded via a resistor R1 to pull the control input to ground in the absence of an input signal. The control signal is then fed to controller 10 via port pin PD2 via a low pass filter comprising of resistor R14 and capacitor C7. Port pin PD2 of controller 10 is the interrupt input. The low pass filter comprising of resistor R14 and capacitor C7 is present to prevent any noise that may be present on the control line from inducing a false event on the interrupt line to the controller 10. A common use for this is dimming control. The input is fed with a low frequency pulse width modulation rectangle wave. Typically, the pulse width modulated rectangle wave is between about 80 to about 200 Hz. When the signal is active H1, the controller 10 drives the MOSFETs Q5A and Q5B. When the signal is active Low, the controller 10 turns OFF MOSFETs Q5A and Q5B. This method of dimming control is referred to as pulse group modulation, since during each active H1 interval of the incoming low frequency control signal, a group of high frequency cycles is used to drive a load. This allows a full range of brightness control while operating the lamp at an optimum current point.

It is recognized that alternate functions for the control input may be employed. The controller can be programmed to perform a wide variety of functions at the occurrence of an interrupt signal PD2 of the controller 10. For example, the control input may be used to execute a preestablished sequence at the occurrence of a single interrupt. This sequence may include any combination of ON and OFF cycles, dimming, flashing, fading and delays. Such a feature may be particularly useful for point of purchase displays, where attention grabbing nature of these types of operations may be beneficial.

Figure 15:
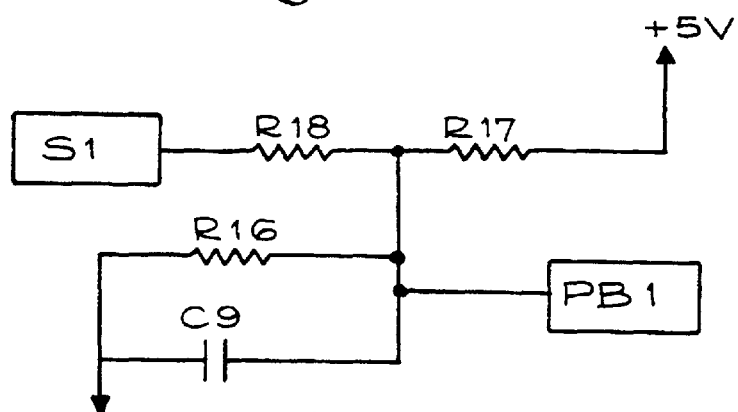
FIG. 15 illustrates an optional alternate dimming circuit for a power supply of a gas discharge lamp.

An alternate dimming circuit eliminates the need to periodically restrike the lamp requires altering the reference voltage such that the target output current is changed. The alternating dimming circuit is illustrated in FIG. 15. The alternate dimming method is accomplished utilizing resistor R18, and removing resistor R17. Installation of resistor R18 allows the comparator's reference voltage to be derived from the input signal on the control pin rather than the voltage divider based on the five volt power supply. In this configuration, the time constant value established by the product of resistor R18 and capacitor C9 is long (on the order of 20 ms) such that a nearly ripple-free DC voltage may be derived from the pulse width modulated input waveform.

Figure 16:
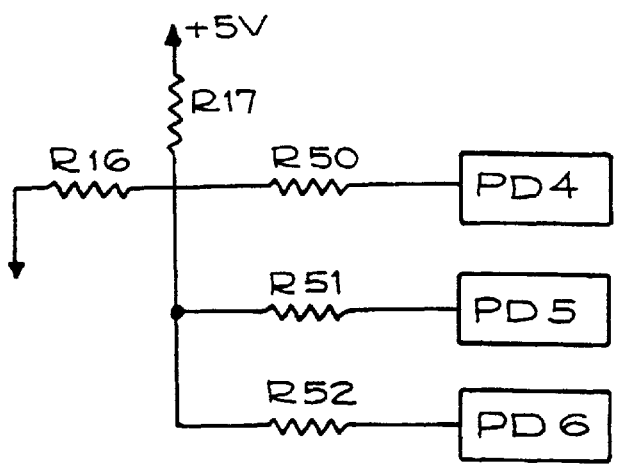
FIG. 16 illustrates an optional hot start circuit for a power supply of a gas discharge lamp.

It may be desirable to accelerate the heating of the lamp on initial turn ON. This is accomplished by altering the reference voltage and therefore the output current. Such a hot start option circuit is illustrated in FIG. 16. Accelerating the heating of the lamp warms the electrodes and gas quicker than what would normally be the case, and therefore decreases the amount of time it would take to fully illuminate the lamp. Upon initial turn ON of the power supply, three of the controller 10 port pins (PD4, PD5 and PD6) are active H1. Because PD4, PD5 and PD6 are connected to the reference voltage divider via resistors R50, R51, R52 the reference value can be changed. Using resistor values with binary weighting, a binary sequence is output to gradually change a reference in a 8 step format. If a fourth controller pin is used, the resolution increases to 16 step format, and so on. Thus, a simple digital to analog (D/A) converter for controlling the reference value is implemented. This allows a high value startup current to be gradually reduced to a nominal output current over a period of minutes with no sudden changes in current, and therefore lamp intensity.

In an embodiment, the controller 10 has FLASH memory. FLASH memory allows a program to be rewritten many times. A controller with in-circuit programmable FLASH memory can be changed while the controller is installed in the circuit. Thus, using such a controller adds flexibility to the design of the power supply. Use of FLASH memory also allows for individual programmability. Special features such as flashing or fading can be economically implemented on small runs because of the FLASH memory of the controller 10. Individual programmability also allows for a complex array of functions, while retaining production cost advantages of producing only one design. Because each power supply may be programmed to respond in a unique way to a common control signal, a single control line can control seemingly very complex lighting functions. For example, by programming a different delay in each of a series of lamps controlled by a common control signal, a single light may appear to run through a string of lights, while accelerating or decelerating. It is contemplated that other complex lighting functions may also be employed.

Multiple special functions can also be accomplished by utilizing multiple pulse widths or a serial communication scheme on a control line without the need of a special controller circuit. A control output option circuit 41 comprises transistor Q7, resistors R26, R27 and R28, and diode D9 (see FIG. 1A). Transistor Q7 acts as a switch used to pull up the control line, based on a command from the controller 10. Resistor R28 limits the base current of transistor Q7. Resistor R27 and diode D9 protect transistor Q7 from incoming transient signals that may be present on the control line. Jumper J4 is a jumper that may be used to couple the output to the control line input, which may be used when employing a large array of power supplies.

It is contemplated that the master power supply need not be operating the main load or lamp. It may be advantageous for a particular application that the power supply be supplied without a lamp. The master power supply may be programmed to not turn ON its outputs. The additional cost of the power output components is minimal as compared to the cost of designing and stocking a separate channel controller. It is also contemplated that a separate multiple output channel controller may be used. In an alternate embodiment, multiple power supplies may be daisy chained together such that the control output of one power supply (W1) feeds the control input (S1) of the next power supply. This may be useful when a simple one directional chaser light function is desired.

Figure 10:
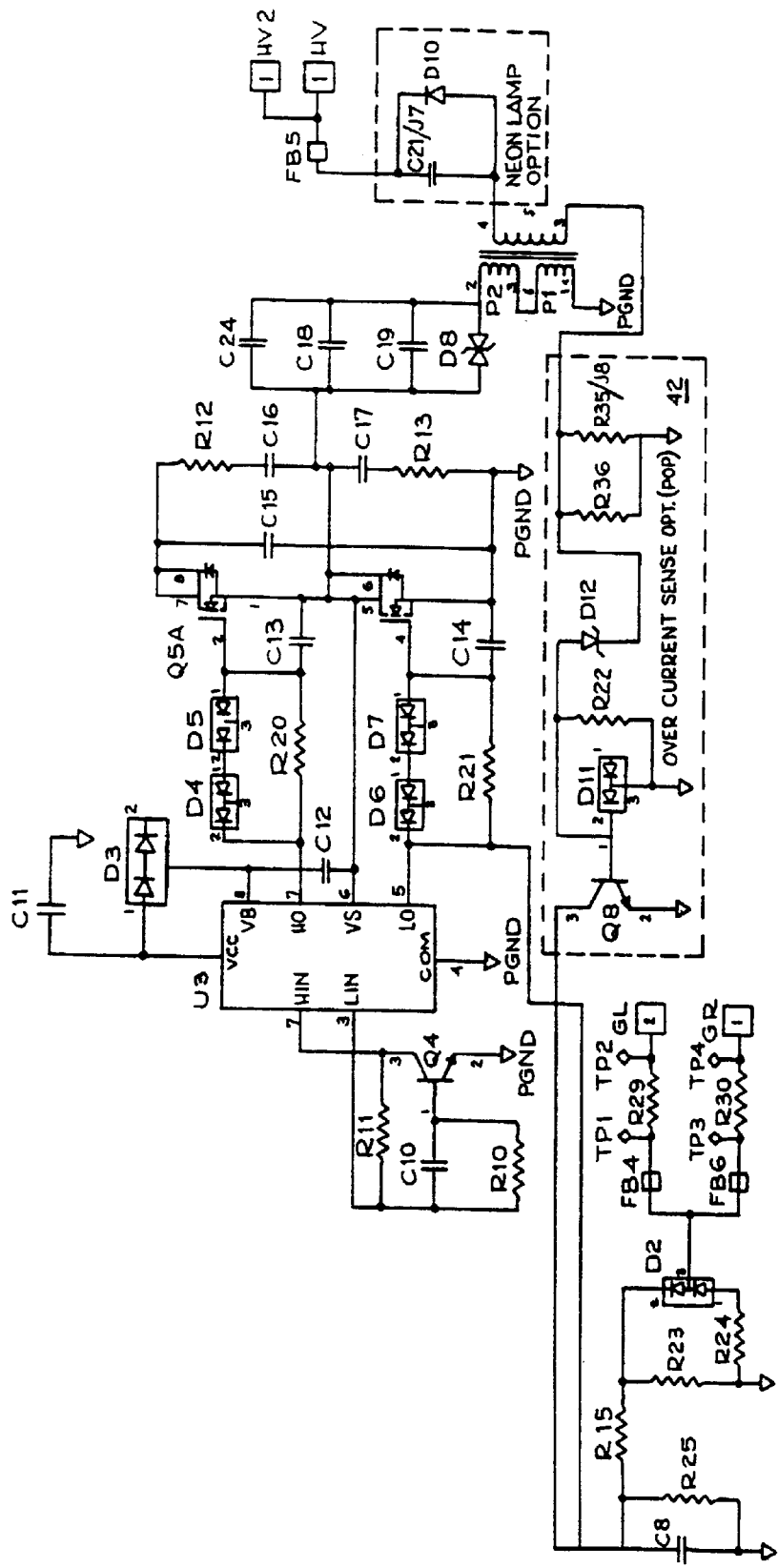
FIG. 10 is a schematic of the power supply of FIGS. 1A, 1B and 1C, highlighting a section of the power supply which may be optionally duplicated to operate multiple loads.

A single unit multi-channel version of the power supply may also be used. A multi-channel neon sequencing device based on the power supply operates independent of other power supplies, and eliminates the need for remote transformers, and generates its own high frequency drive signals. The power supply is powered either directly from 120 VAC or from a wall mounted power supply. In order to evolve a single channel unit into a multiple channel unit, the power output section of the power supply is duplicated, as illustrated in FIG. 10. In an embodiment, a controller such as the AT90S1200 is capable of driving up to four loads. If additional capability is needed, other micro-controllers such as the AT90OS4414 may be employed to drive additional loads.

A ceramic capacitor C6 provides local bypassing of the power supply for the controller 10. A ceramic resonator X1 provides the time base for the controller 10. A quartz crystal may also be used. The ceramic resonator X1, however, is less expensive and eliminates the need for load capacitors while still providing sufficient timing accuracy.

As described above, the circuit is designed for applications using a low voltage DC power source. However, the circuit is also well suited for applications where the power source is of a higher voltage, either AC or DC. In order to modify the circuit to operate at higher voltages, the MOSFETs is changed to devices with higher voltage ratings. The number of primary turns on the transformer T1 also needs to be increased. The values of the resonate capacitors is decreased while the voltage rating is increased. Also, because the transformer's primary current decreases with the increase in drive voltage, the existing transformer bobbin is typically capable of handling additional turns of finer gauge wire. In applications such as traffic lights, gas discharge lamps are of a power within the range of the types power supplies of the invention.

The controller 10 may also optionally be used with a temperature sensor. The temperature sensor may monitor the temperature of any component in the power supply, or even the ambient air temperature. In an optional embodiment, the temperature sensor senses the temperature of the lower half bridge MOSET Q5A. If an over temperature condition exists, corrective action, such as shutting down the circuit or cycling the circuit OFF and ON, may be taken. Alternatively, the output pin of the controller 10 allows the temperature sensor to be powered down if the controller 10 enters a shutdown state. This may particularly be useful in battery powered applications where conservation of power is a critical issue.

During normal operation, the software operating the system samples the comparator to check if the output current needs to be adjusted. This is normally accomplished as a background function, as described in regards to FIG. 13. The current is sampled by a single comparator with no hysteresis, which is used to force to a very tight window of allowable current. A filter, preferably in software, prevents the output from bouncing between two current levels. An alternate embodiment may use hysteresis to form a hardware forced current window. The hysteresis may be a hardware circuit, or a software function that monitors for a need for an increased current on one pass through a background loop, and monitors for a need for a decreased current on the next pass through a background loop. A current for a hardware forced current window uses an additional resistor R19 connected from a port pin of the comparator to the center of the referenced voltage divider. In the variant, the port pin connected to resistor R19 is driven to an act of high state, thereby allowing a capacitor C4 to charge to a new value. Then, a comparator check senses the output current value. If the current is too high, the current level needs to be decreased. Thus, the port pin connected to the resistor R19 is taken to an active low state, allowing capacitor C4 to discharge to a new voltage level. Another comparator sampling is done to check if the output current is too low, thereby needing to be increased.

The output transformers used in various versions of the power supply may exhibit a large decrease in input impedance when the secondary is in an open circuit condition. This may cause a large increase in primary current. If the primary current rises too high, the current rating of the resonant capacitors may be exceeded, potentially damaging the capacitors or the power supply. Also, damage to the capacitors may emit a foul odor. To prevent a foul smelling capacitor and to increase circuit reliability, a by-directional transorb D8 is placed in parallel with the resonate capacitor. The transorb prevents the instantaneous peak voltage on the resonate capacitor from ever reaching a value that will damage the capacitor. The energy that would otherwise damage the capacitor is instead absorbed by the transorb D8. A fault detector will cause the controller 10 to shut down the power supply before the transorb D8 builds sufficient heat to cause damage to the transorb.

A combination of a resonant capacitor and transformer design for a power supply is such that they can develop more output current then desired when operating in ideal conditions, and are driven at near the resonant frequency and at nearly a 50% duty cycle. This allows the normal operating point to be at a frequency somewhat removed from the resonant frequency, or a duty cycle somewhat removed from 50%. This allows room for the power supply to increase its current in response to a phenomenon that would tend to decrease the output current. For example, a cold lamp, an aging lamp, or an input power supply of a lower voltage then normal may tend to decrease the output current. However, given a limited compliance range, a lower than normal lower current limit may be desirable to allow the power supply to continue to operate without generating a fault indication, and thereby shutting down. A resistor R19 provides such a function, alternate to the function previously described for resistor R19. When, after multiple samples, it is determined that the desired output current cannot be obtained even when operating at full output current, a port pin of the controller 10 is taken to an active low state thereby lowering the reference voltage and allowing a lower current threshold. If the output current is maintained above the new lower threshold, the output port pin is periodically taken to active high state in an attempt to restore the normal operating current level. If the output current cannot be maintained above the lower threshold, a fault is considered to exist and the unit is shut down.

In some cases, a gas discharge lamp is driven with a high frequency 50% duty cycle waveform, plasma bubbles may develop along the length of the tube. Super imposing a DC offset current on the AC output of the transformer eliminates this problem. A parallel combination of diode D10 and capacitor C21, option neon lamp circuit 45, provides such a DC offset current. These parallel components are in series with the output, and forces the impedance for current flow in one direction to be different from the other direction, thus inducing a DC offset on the output current.

A problem encountered in using a DC offset technique to eliminate plasma bubbles is that migration may occur on one end of the tube, causing the other end of the tube to darken. This problem is particularly apparent in mercury/argon gas discharge tubes. To solve mercury migration problems, driving the half bridge MOSFETs Q5A and Q5B non-symmetrically may eliminate this problem if the drive wave forms are periodically reversed. See U.S. Pat. No. 5,189,343 issued Feb. 23, 1993, which is incorporated by reference herein.

In a preferred embodiment, the controller 10 uses EEPROM memory. EEPROM memory is non-volatile memory—that is, memory is retained when the power is removed from the unit. The non-volatile memory feature of the controller 10 allows one to include a number of features stored in memory of the controller. EEPROM memory also allows one to include a run time clock with the power supply. Several bytes of memory are used to form a ripple counter that is periodically updated by the software whenever the supply is running. The value of a run time counter includes that it may be read back at any time in the future, using a serial programming connector. Run time information may be useful for tracking occurrences of faults and other operational information. Run time information may also be used to change behavior of the lamp after some period of time. For example, a flash sequence may change after some number of run hours. Another possible application is planned obsolescence. For example, a discharge lamp will operate for a certain amount of time or for a certain function or to commemorate a certain event. EEPROM memory may also be used to record the occurrence of a fault. Such recording may be read at a later date, to determine the cause of a failed lamp or to direct redesign efforts. Manufacturing serial numbers and date of manufacture information may also be recorded in the EEPROM memory. Recording such information may be particularly useful for isolating batch failures and the like. The EEPROM memory may also used to record the number of times a given fault occurs. Further, faults may be allowed to occur a certain number of times for a unit is permanently shut down and unable to restart. Because EEPROM may be written externally, a permanent shut down condition may be reset by a technician. The EEPROM memory may also be used to retain previous brightness levels on a power supply with a built in dimming function. Such a dimmer may used with a pair of switches rather than a potentiometer to set the brightness level. When the lamp is reenergized, the previous brightness level may be re-established.

Figure 2:
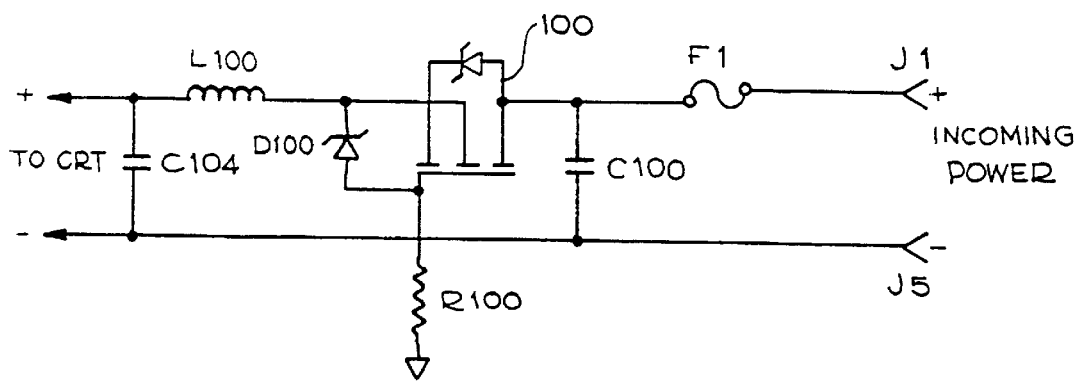
FIG. 2 is a schematic of a P-channel reverse protection metal oxide semiconductor field effect transistor (MOSFET) of a power supply for a gas discharge lamp.

FIG. 2 is a schematic of a P-channel reverse protection MOSFET 100 of a power supply for a gas discharge lamp. If a P-channel MOSFET is used, instead of an N-channel MOSFET, the P-channel MOSFET is connected in circuit in the incoming positive power line with the drain (D) of MOSFET 100 connected to fuse F1 and the source (S) connected to inductor L1. Operation is similar to operation when an N-channel MOSFET is used, with the exception that the gate (G) is negative with respect to the source (S) in order to enhance the MOSFET, and thus, turn the MOSFET ON. Negative bias is provided by circuit ground. To prevent damage to the MOSFET, the gate (G) to source (S) voltage of the MOSFET should be limited to about fifteen volts. Accordingly, a zener diode D100 is connected in circuit between the gate and source, and a resistor R100 is connected in circuit between the gate and circuit ground.

Figure 3:
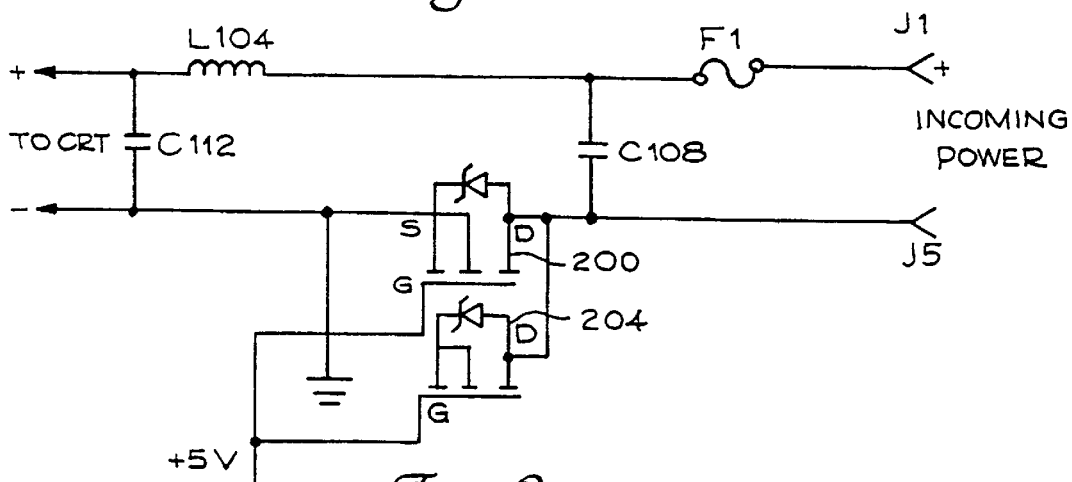
FIG. 3 is a schematic of two parallel N-channel reverse protection MOSFETs of a power supply of a gas discharge lamp.

In an alternate embodiment preferable for higher powered versions of the power supply, two parallel N-channel MOSFETs may be used for reverse protection. FIG. 3 is a schematic of two parallel reverse protection MOSFETs 200 and 204 of a power supply of a gas discharge lamp. The MOSFETs 200 and 204 are connected in circuit in parallel, with the source (S) of each MOSFET connected together. Connecting both MOSFETs 200 and 204 in parallel reduces conduction losses and minimizes the voltage drop that may result from the MOSFET in the reverse protection function.

Figure 4:
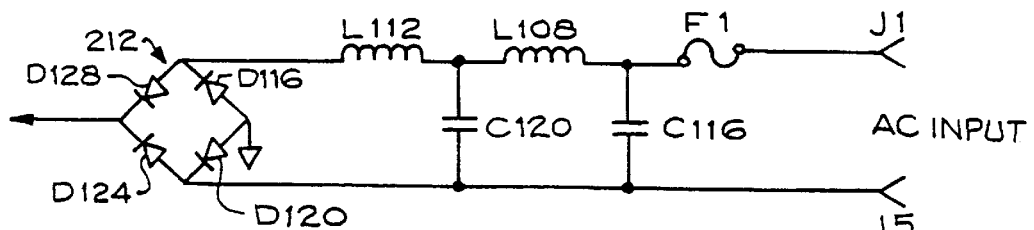
FIG. 4 is a schematic of an AC power input circuit with a bridge rectifier of a power supply of a gas discharge lamp.

FIG. 4 is a schematic of an AC power input circuit with a bridge rectifier of a power supply of a gas discharge lamp. Such a circuit is used when it is advantageous to operate the power supply from an AC power source as opposed to a DC power source. In the AC power input circuit, a bridge rectifier circuit 212, comprising diodes D116, D120, D124 and D128, is connected in circuit between the AC input terminals J1 and J5. Note that the circuit in FIG. 4 is shown with an EMI filter composed of C116, C120, L108 and L112 between the fuse and the bridge rectifier.

Figure 5:
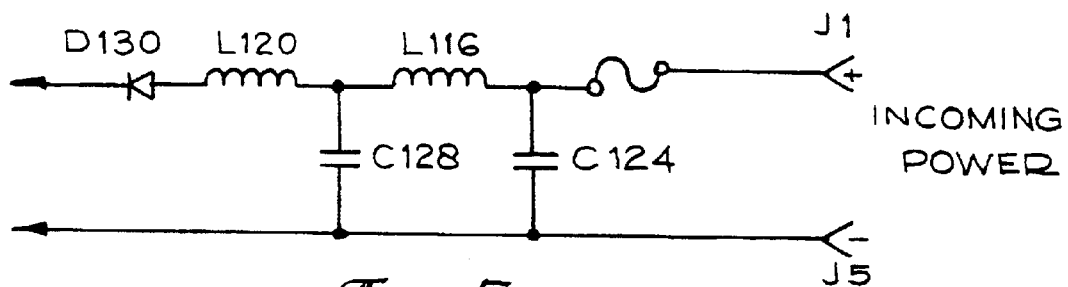
FIG. 5 is a schematic of a simple rectifier reverse protection circuit of a power supply of a gas discharge lamp.

FIG. 5 is a schematic of a simple rectifier reverse protection circuit of a power supply of a gas discharge lamp. In an alternate embodiment, a diode D130 can replace the reverse polarity protection MOSFET. Use of diode D130 reduces cost but increases heat dissipation. Further, as the incoming current becomes greater, the power lost in using diode D100 increases. As illustrated in FIG. 5, the diode D130 is connected in circuit downstream of a noise filter composed of C124, C128, L116, L120 and a fuse.

Figure 6:
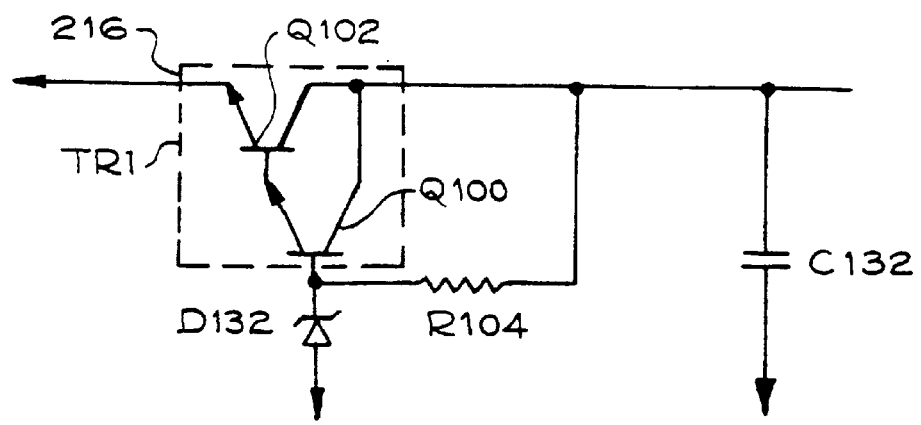
FIG. 6 is a schematic of a transistor regulator of a power supply of a gas discharge lamp.

FIG. 6 is a schematic of a transistor regulator of a power supply of a gas discharge lamp. Use of the transistor regulator TR1 reduces costs from the circuit with a minimal degradation in reliability. The transistor regulator TR1 comprises the darlington transistors comprising Q100 and Q102, and resistor R104 and diode D132. In a preferred embodiment, the value of diode D6 is approximately 6.2 volts. Note that this circuit configuration can also be used as a pre-regulator, to reduce the incoming voltage to a voltage acceptable for use with a integrated circuit regulator. Also, this circuit may be built with a single transistor rather than a two-transistor darlington configuration, to reduce circuit cost.

Figure 7:
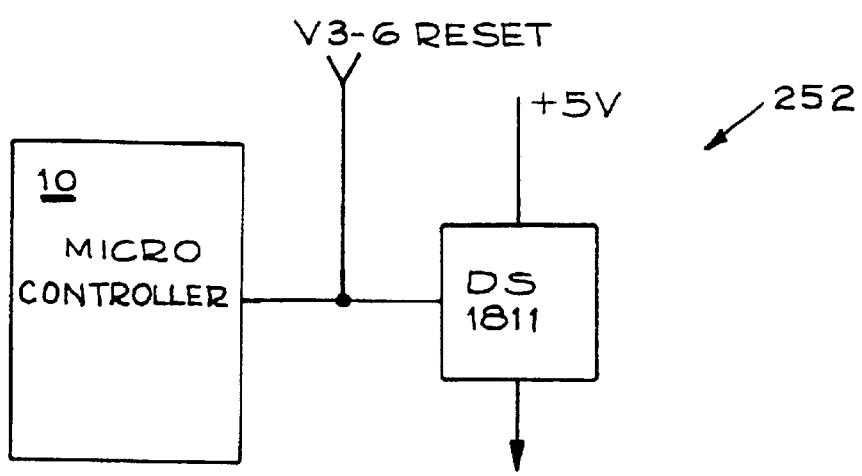
FIG. 7 is a schematic of a microcontroller reset circuit of a power supply of a gas discharge lamp.

FIG. 7 is a schematic of a reset circuit of a power supply of a gas discharge lamp. A reset circuit 252 may be used if it is determined that a brown out or EMI induced controller fault event is likely. Alternatively, the controller's reset pin can be left floating (i.e., not tied to ground or another circuit), or the reset pin can be connected to an external pull-up resistor. As an alternate embodiment, the controller 10 may have an internal built-in start-up and/or brown-out reset circuit.

Figure 8:
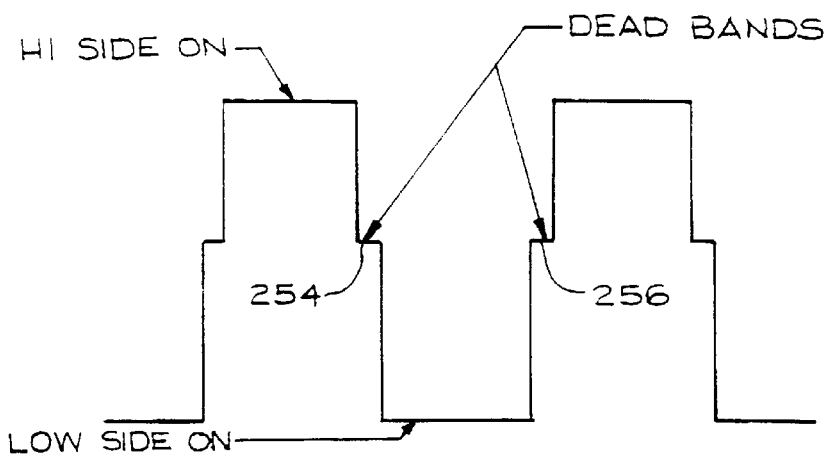
FIG. 8 is an illustration of an input waveform used in driving a power supply of a gas discharge lamp.

FIG. 8 is an illustration of an input waveform used in driving a power supply of a gas discharge lamp. The input waveform is a slightly modified square wave. A brief delay occurs after one of the MOSFET's, either Q5A or Q5B, in the half bridge is turned OFF, prior to the other MOSFET (either Q5A or Q5B) turns ON—the delay is referred to as a deadband. The deadbands 254 and 256 are long enough to ensure that one of Q5A or Q5B is completely OFF prior to the other MOSFET, either Q5A or Q5B turning ON. If both MOSFETs are ON simultaneously, a "shoot through" current may occur, which dramatically increases MOSFET heating, reduces efficiency, and make cause the fuse F1 to blow and potentially damage the MOSFET's Q5A and Q5B.

Referring back to FIG. 1B, immediately following turning OFF of either Q5A or Q5B, the transformer current continues to flow due to the inductance of the transformer T1's primary winding. Because the previously conducting MOSFET is now OFF, the decaying current from the transformer flows through the body diode of the other MOSFET. The deadband should also be long enough to ensure that the current decay is complete, as turning ON the opposite MOSFET prior to completion of this interval will cause current to shoot through.

While there are minimum time requirements for the period, any period in excess of that interval represents a loss of drive period and results in a decrease in peak transformer output. Thus, it is best to keep the deadband interval to a minimum. If an operating frequency of 80 kHz is used, the period for one complete deadband cycle is 12.5 usec. If a micro-controller such as an Intel 8051 or a Zilog Z80 is used, with a clock frequency of approximately 12 MHz, the instruction time is about 1 MHz (due to internal frequency dividing in the controller 10) and thus the shortest deadband generated is approximately 1 usec. In a preferred embodiment, there are two deadbands per cycle, corresponding to a conduction period loss of 2 usec per 12.5 usec, or 16%. If an AVR microprocessor is used having a clock and instruction frequency of 12 MHz, a minimum deadband of 83.3 nsec is needed. This allows a minimum conduction period loss of approximately 1.3%.

Figure 9:
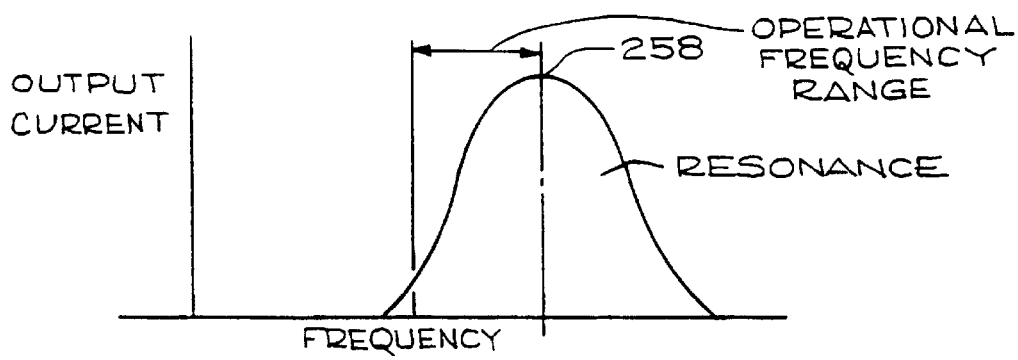
FIG. 9 is a graph of output current versus drive frequency illustrating an optimal operational frequency range of a power supply of a gas discharge lamp.

FIG. 9 is a graph of output current versus drive frequency illustrating an optimal operational frequency range of a power supply of a gas discharge lamp. In order to deliver a maximum current to the load, the transformer T1 should be driven at the resonant frequency of the transformer and the resonant capacitor. Operation on either side of the maximum current point 258 decreases the current delivered to the load. Such off resonance operation, or frequency modulation, gives one method of regulating the output current. In order to use this current regulation method, it is important that many steps of frequency resolution are available to use. In a typical transformer, with a resonant frequency of 80 kHz, the output current is reduced by a factor of approximately 10 when the operating frequency is reduced to 60 kHz. In some cases, it is desirable to have a symmetric drive waveform, thus having equal changes in duration of both the positive and negative drive half-cycles. The use of an (AVR) micro-controller allows having the provision of many frequency steps to facilitate a frequency based current regulation scheme. The instruction time of the AVR micro-controller is approximately 83 nsec (with a 12 MHz crystal) allowing 25 frequency step points between the two extremes. Thus, the use of an AVR micro-controller is especially applicable in driving gas discharge lamp power supplies.

The MOSFET drive frequency may be less than the resonant frequency of the LC circuit comprised of transformer T1's primary winding 22 and resonant capacitors C24, C18 and C19. In that case, the lamp's brightness may be changed by changing the difference between the drive frequency of switches Q5A and Q5B on the one hand and the LC circuit's resonant frequency on the other hand. For example, the lamp brightness may be decreased by having the controller output a signal having a decreased frequency, and the lamp brightness may be increased by increasing the controller's output signal.

If the MOSFET drive frequency is greater than the LC circuit's resonant frequency, the lamp brightness may be increased by reducing the MOSFET drive frequency as long as the drive frequency remains greater than the resonant frequency. The lamp brightness may alternately be decreased by further increasing the drive frequency.

In short, the absolute value of the difference between the MOSFET drive frequency (or, the frequency of the controller's output signals, to the extent it differs from the drive frequency) and the resonant frequency of the transformer primary and resonant capacitor is increased to reduce lamp brightness, and is decreased to increase lamp brightness.

This feature may also be used cause the lamp to flicker or flash, by cyclically tuning and detuning the LC resonant circuit through control of the MOSFET drive frequency.

FIG. 10 is a schematic of a portion of the power supply of FIGS. 1A, 1B and 1C. This section of the power supply may be duplicated to operate multiple loads. In such an arrangement, multiple loads may be driven using large portions of the main circuit by operating multiple sections in parallel.

Figure 11:
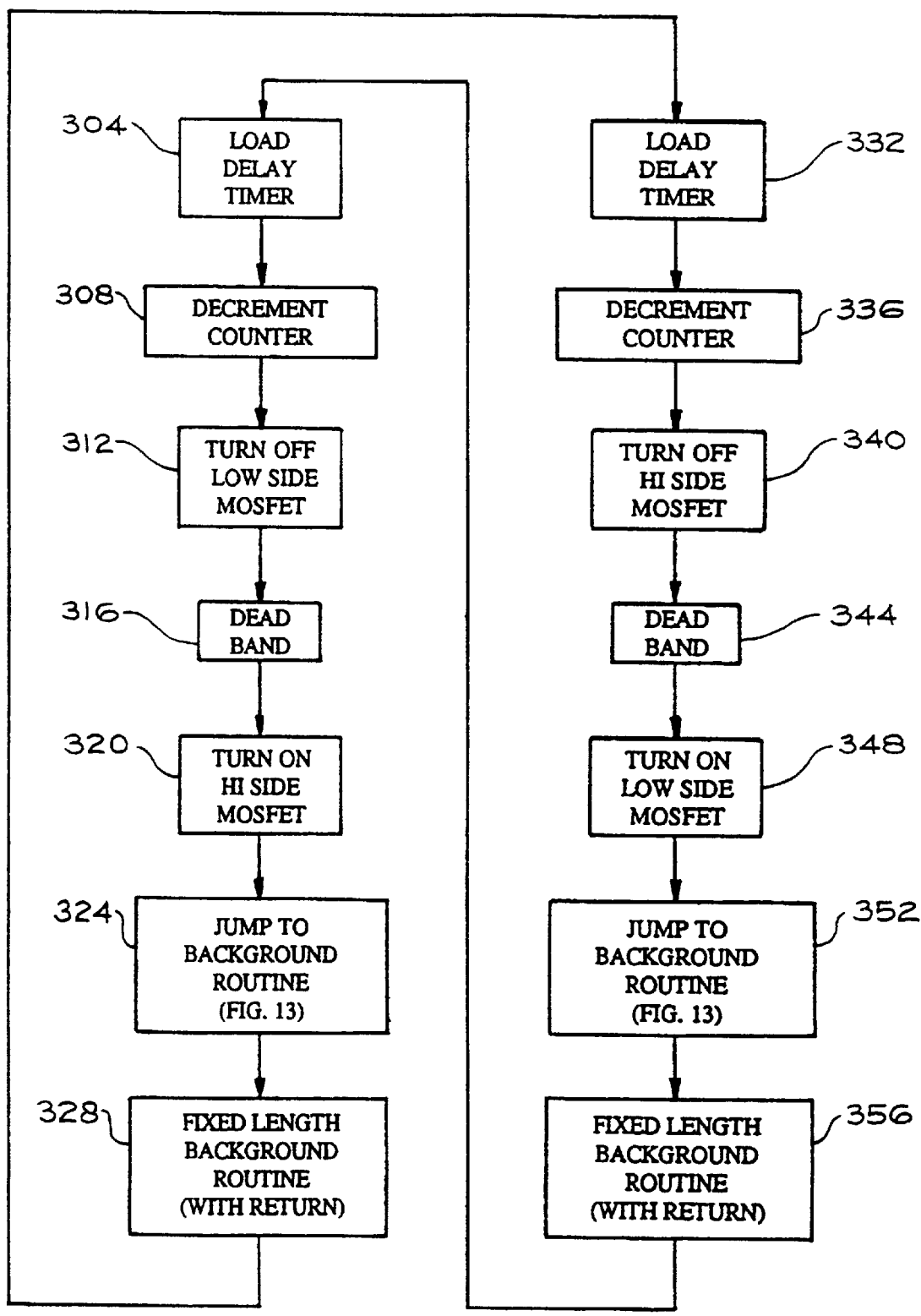
FIG. 11 is a flow chart illustrating operation of a timer circuit of a power supply of a discharge lamp.

FIG. 11 is a flow chart illustrating operation of a timer circuit of a power supply of a discharge lamp. A preestablished delay value is loaded into a countdown time register (304). The register is decremented until it reaches zero (308) at which point the low side MOSFET Q5B is turned OFF (312). After a brief deadband time period (316) the high side MOSFET Q5A is turned on (320). Using a 12 MHz crystal, the deadband is approximately 83 nsec. It may be desirable to use a longer deadband for given output topology. The length of the deadband may be increased by adding additional software delays. After the high side MOSFET is turned ON, background routines may be run to execute background functions (324). While conditional branches may occur in running the background routine, the background routine is carefully timed such that regardless of the actual branch taken, the time period to execute the entire background routine is unchanged (328). Maintaining a fixed time limit for the background routine ensures that the overall drive period and duty cycle does not substantially change, and thus the output current is not affected.

After executing the background routine, the program continues by again loading the delay timer and continuing the loop. The preestablished delay value is again loaded into the countdown time register (332). The register is decremented (336) at which point the high side MOSFET Q5A is turned OFF (340). After a brief deadband time period (344) the low side MOSFET Q5B is turned ON (348). After the low side MOSFET is turned ON, background routines may be run to execute background functions (352). Again, the time period to execute the entire background routine is unchanged (356). After executing the background routine, the program continues by again loading the delay timer (304) and continuing the loop.

Many functions can occur during the background routine step. Background routines include checking the output current to determine if the output current needs to be increased or decreased, determining the new count delay value based on the new desired output current level, resetting the timer, adding any flashing, fading, or other dimming functions, monitoring fault conditions, executing a shut-down or other fault based condition, or writing to and reading from the EEPROM memory.

Typically, the period of time available to run the background routine is insufficient to allow all background functions to be executed. In some cases, splitting these functions between two background loops may be sufficient. However, in other cases, splitting the functions still leaves insufficient time. In order to allow all background functions to be executed, the background loop may include a sequencer executing different functions on a sequential passes through the background routine. This is illustrated in FIG. 13, a flow chart illustrating the timing sequence to operate background functions of a power supply of a gas discharge lamp. The number of separate functions that may be executed during different passes of the background routine is virtually unlimited. However, the more separate subloops that are executed, the less frequently each function may be executed. The sequencer 360 prioritizes background functions to be run. Then, during each loop, various background functions 364, 368 and 372 may be run during the fixed time length to operate a background routine (see FIG. 11, steps 328 and 356). The sequencer 360 determines which of the background functions are run on each pass through the background routine. After the background function is completed, the background function ceases and the program returns to the basic operating loop at step 304 or 332 of FIG. 11.

The mechanisms used by the software to regulate output current is frequency, and duty cycle. In the frequency regulated version, the peak operating frequency is slightly less than the resonant frequency of the transformer and the resonant capacitor. In order to reduce the output current, the frequency is further reduced, which further detunes the resonant circuit and reduces the output current.

In the duty cycle regulated version, the duty cycle is at or near 50% for peak output current, and is deviated from 50% to reduced current. The duty cycle version normally operates at a fixed frequency that is near the resonant frequency.

Figure 12:
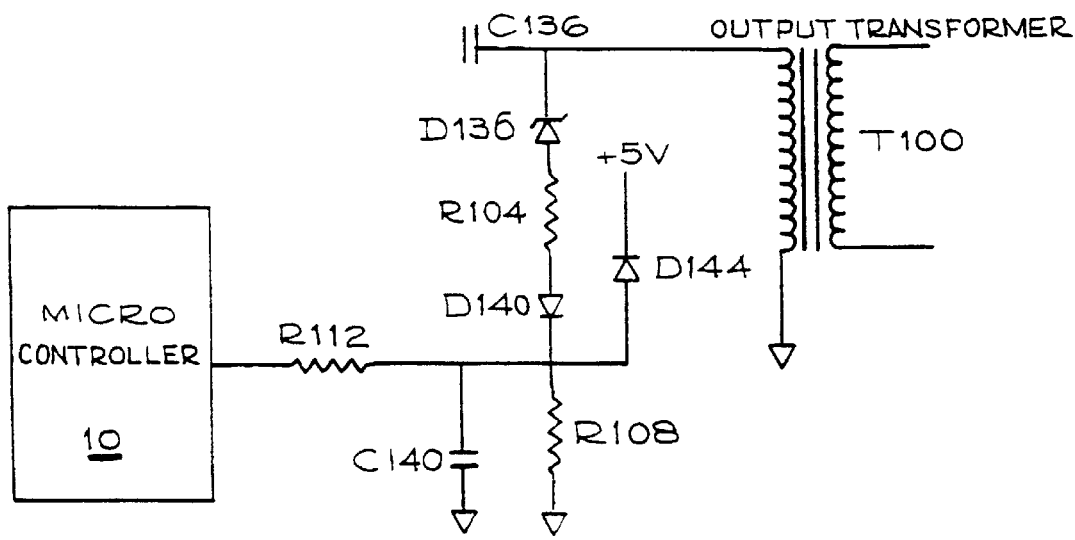
FIG. 12 illustrates an optional output open circuit and overvoltage circuit detector for a power supply of a gas discharge lamp.

FIG. 12 illustrates an optional output open circuit and overvoltage circuit detector for a power supply of a gas discharge lamp. If an over voltage condition exists, the peak voltage realized on the secondary winding will increase to a value much larger than normal. This voltage on the secondary winding is reflected back to the primary winding in a ratio determined by the number of turns of the transformer. Since both the primary and secondary winding of the transformer T100 are ground referenced, the magnitude of the voltage realized on the primary winding is proportional to the magnitude of the voltage realized on the secondary winding. When an over voltage condition exists, the AC voltage present on the primary winding of the transformer T100 rises substantially. The positive peak of the waveform will increase to a point greater than the breakdown voltage of the zener diode D136, thereby causing the zener diode D136 to conduct. A current will then flow through resistor R104, thereby forward biasing diode D140 and charging capacitor C140. This causes a logic high condition to be realized at the micro-controller port input, indicating a fault. The software driving the micro-controller then initiates shut-down procedures or other corrective action. The diode D144 limits the charging of the capacitor to the five-volt power supply, and resistor R112 limits the current into the port pin of the microprocessor U2 to a safe value. The capacitor C140 holds the fault condition indicator for a period long enough such that the over voltage fault monitoring code is not time critical. Thus, the over voltage fault monitoring may be located in a background routine.

What is claimed is:

1. A power supply for a gas discharge lamp, comprising:
an input circuit that receives power from a power source;
an output transformer, having a primary winding and a secondary winding, the lamp being connected in circuit across the secondary winding;
first and second power switches that switch power to said primary winding;
a driver that drives said switches at a drive frequency;
a tuned LC resonant circuit having a resonant frequency, connected in circuit between said driver and said lamp;
a controller that generates control signals to said driver at a first frequency that is functionally related to said drive frequency, and that regulates the lamp current by controlling the difference between said resonant frequency and said first frequency, whereby controlling said difference between said resonant frequency and said first frequency controls lamp brightness during normal lamp operation; and
wherein said controller outputs said control signals at a drive frequency that is less than said resonant frequency, and wherein said controller detunes said LC circuit by reducing said drive frequency to thereby reduce said lamp current.

2. The power supply of claim 1, wherein said transformer is a step-up transformer, and wherein said LC circuit includes said primary winding and at least one capacitor.

3. The power supply of claim 1, wherein said controller outputs said control signals at a drive frequency that is greater than said resonant frequency, and wherein said controller detunes said LC circuit by increasing said drive frequency to thereby reduce said lamp current.

4. The power supply of claim 1, wherein said controller includes flash memory.

5. The power supply of claim 1, further comprising an electrically erasable programmable read only memory (EEPROM).

6. The power supply of claim 5, wherein said EEPROM is disposed within said controller.

7. The power supply of claim 5, further comprising:
means for inputting run time information to said EEPROM.

8. The power supply of claim 7, wherein said run time information includes the run time of said controller.

9. The power supply of claim 7, wherein said lamp has an actual brightness level that is stored in said EEPROM, and further comprising:
a pair of switches that input a desired lamp brightness level.

10. The power supply of claim 7, further comprising:
means for inputting fault information to said EEPROM.

11. The power supply of claim 10, further comprising:
means for disabling the power supply upon the occurrence of a predetermined number of faults.

12. The power supply of claim 11, further comprising:
a programming device that resets said disabled power supply by writing data to said EEPROM.

13. The power supply of claim 1, further comprising:
a feedback circuit that senses the current through the lamp and that outputs a feedback signal to said controller.

14. The power supply of claim 13, wherein said controller includes a comparator that compares said feedback signal to a reference signal, and wherein said comparator includes a hysteresis circuit that helps maintain the lamp current within a selected range.

15. The power supply of claim 14, wherein said hysteresis circuit is maintained in hardware.

16. The power supply of claim 14, wherein said hysteresis circuit is maintained in software.

17. The power supply of claim 14, wherein said reference signal is an analog reference signal.

18. The power supply of claim 14, wherein said reference signal is a stored, digital reference signal.

19. The power supply of claim 13, wherein said controller includes a memory that stores a reference value with which said feedback signal is compared, and wherein said power supply further comprises:

means for changing said reference value.

20. The power supply of claim 13, wherein said controller is programmed to keep the lamp current within a selected range.

21. The power supply of claim 1, further comprising:

a watch dog timer that resets said controller when said controller stops operating properly.

22. The power supply of claim 1, further comprising:

a circuit that monitors the primary winding for excessive voltage.

23. The power supply of claim 1, wherein said switches are transistors.

24. The power supply of claim 23, wherein said transistors are metal oxide semiconductor field effect transistors (MOSFETs).

25. The power supply of claim 23, wherein said transistors are insulated gate bipolar transistors (IGBTs).

26. The power supply of claim 1, further comprising:

a temperature sensor that outputs a signal to said controller functionally related to a sensed temperature.

27. The power supply of claim 26, wherein said temperature sensor is disposed near one of said switches and monitors the temperature of one of said switches.

28. The power supply of claim 26 wherein said controller reduces the lamp current if the sensed temperature exceeds a predetermined level.

29. The power supply of claim 1, further comprising:

a reset circuit that resets the controller after the input voltage is reduced below a predetermined level.

30. The power supply of claim 1, further comprising;

an overvoltage protector that protects said LC circuit from overvoltage.

31. The power supply of claim 1, further comprising:

a circuit that protects the power supply from a reverse polarity connection.

32. A method of regulating the lamp current to a gas discharge lamp, comprising:

providing an output transformer having a primary winding and a secondary winding;

providing a tuned LC resonant circuit having a resonant frequency that is connected to interact with said secondary winding;

generating control signals at a first frequency;

switching a pair of switches at a drive frequency that is functionally related to said first frequency;

controlling the difference between said first frequency and said resonant frequency to regulate the current to said lamp within a selected range, whereby controlling the difference between said first frequency and said resonant frequency controls lamp brightness during normal lamp operation;

providing a programmable controller; and running a software control routine to generate said control signals.

33. The method of claim 32, wherein said resonant circuit providing step includes connecting said primary winding such that said primary winding is part of said LC circuit.

34. The method of claim 32, wherein said controlling step includes reducing said drive frequency to detune said LC resonant circuit and thereby reduce the lamp current.

35. The method of claim 32, wherein said controlling step includes increasing said drive frequency to detune said LC resonant circuit and thereby reduce the lamp current.

36. The method of claim 32, further comprising:

providing a controller with electrically erasable programmable read only memory (EEPROM).

37. The method of claim 36, further comprising:

storing run time information in said EEPROM.

38. The method of claim 36, further comprising:

storing fault information in said EEPROM.

39. The method of claim 36, further comprising:

storing information regarding the number of ON and OFF cycles of said lamp in said EEPROM.

40. The method of claim 39, further comprising:

using said stored information for fault analysis.

41. The method of claim 39, further comprising:

using said stored information to change an operating characteristic of said power supply.

42. The method of claim 32, wherein said generating step includes generating a two phase rectangular control signal.

43. The method of claim 32, further comprising:

running at least one software background routine when said control routine is not running.

44. The method of claim 43, further comprising:

checking for fault conditions during the running of the background routine.

45. The method of claim 43, further comprising:

changing the first frequency during the running of the background routine.

46. The method of claim 43, further comprising:

determining the brightness level of the lamp during the running of the background routine.

47. The method of claim 43, further comprising:

writing data to a watch dog timer during the running of the background routine.

48. The method of claim 43, further comprising:

executing a lamp shutdown during the running of the background routine.

49. The method of claim 32, further comprising:

sensing the current through the lamp; and comparing said sensed current to a reference signal.

50. The method of claim 49, further comprising:

increasing said reference signal during startup to expedite the warm up of the lamp.

51. The method of claim 49, wherein said reference signal is an analog reference signal.

52. The method of claim 51, further comprising converting the analog digital signal to a stored digital reference value.

53. The method of claim 32, further comprising:

decreasing said reference signal after said increasing step.

54. A power supply for powering a gas discharge lamp, the power supply being electrically connectable to a power source and to the lamp, the power supply comprising:

a transformer and tuned LC circuit combination, the combination including a transformer having a primary winding and a secondary winding, and a tuned LC circuit including said primary winding and at least one capacitor electrically connected in a series relationship to said primary winding, the LC circuit having a resonant frequency;

first and second switches that switch power from the power source, the switched power being provided to said LC circuit;

a controller in communication with the first and second switches, the controller being configured to generate control signals at a control frequency, the control signals resulting in the first and second switches switching the power at a switch frequency, the switch frequency being functionally related to the control frequency, and regulate the lamp current by controlling the difference between said resonant frequency and said switch frequency, whereby controlling said difference between said resonant frequency and said switch frequency controls lamp brightness during normal lamp operation.

55. The power supply of claim 54, further comprising a driver electrically connected to the controller and the switches, the driver receiving the control signals and driving the switches at the switch frequency.

56. The power supply of claim 54, wherein said controller is configured to regulate the lamp current by outputting a control frequency that results in the switch frequency being less than the resonant frequency, thereby detuning said LC circuit and reducing said lamp current.

57. The power supply of claim 54, wherein said controller is configured to regulate the lamp current by outputting a control frequency that results in the switch frequency being greater than the resonant frequency, thereby detuning said LC circuit and reducing said lamp current.

58. The power supply of claim 54, wherein said controller includes flash memory.

59. The power supply of claim 54, further comprising an electrically erasable programmable read only memory (EEPROM).

60. The power supply of claim 59, wherein said EEPROM is disposed within said controller.

61. The power supply of claim 59, further comprising:
means for inputting run time information to said EEPROM.

62. The power supply of claim 59, wherein said lamp has an actual brightness level that is stored in said EEPROM, and further comprising:

a pair of switches that input a desired lamp brightness level.

63. The power supply of claim 59, further comprising:
means for inputting fault information to said EEPROM.

64. The power supply of claim 63, further comprising:
means for disabling the power supply upon the occurrence of a predetermined number of faults.

65. The power supply of claim 54, further comprising:
a feedback circuit that senses the current through the lamp and that outputs a feedback signal to said controller.

66. The power supply of claim 65, wherein said controller includes a comparator that compares said feedback signal to a reference signal, and wherein said comparator includes a hysteresis circuit that helps maintain the lamp current within a selected range.

67. The power supply of claim 65, wherein said controller includes a memory that stores a reference value with which said feedback signal is compared, and wherein said power supply further comprises:
means for changing said reference value.

68. The power supply of claim 54, wherein said controller is programmable controller, and wherein the programmable controller is programmed to regulate the lamp current within a selected range.

69. The power supply of claim 54, further comprising:
a circuit that monitors the primary winding for excessive voltage.

70. The power supply of claim 54, further comprising:
a temperature sensor that outputs a signal to said controller functionally related to a sensed temperature.

71. The power supply of claim 70, wherein said temperature sensor is disposed near one of said switches and monitors the temperature of one of said switches.

72. The power supply of claim 70, wherein said controller reduces the lamp current if the sensed temperature exceeds a predetermined level.

73. The power supply of claim 54, further comprising:
a reset circuit that resets the controller after the input voltage is reduced below a predetermined level.

74. The power supply of claim 54, further comprising;
an overvoltage protector that protects said LC circuit from overvoltage.

75. The power supply of claim 54, further comprising:
a circuit that protects the power supply from a reverse polarity connection.

* * * * *